US012603873B2

(12) United States Patent
Narendranathan et al.

(10) Patent No.: US 12,603,873 B2
(45) Date of Patent: Apr. 14, 2026

(54) DYNAMIC ONE-TIME USE KNOWLEDGE-BASED AUTHENTICATION VIA MULTI-SOURCED PRIVATE DATA USING ARTIFICIAL INTELLIGENCE TECHNIQUES

(71) Applicant: Matrixed IP Holdings, LLC, Gilbert, AZ (US)

(72) Inventors: Agasthya P. Narendranathan, San Ramon, CA (US); James M. Dzierzanowski, Gilbert, AZ (US)

(73) Assignee: MATRIXED IP HOLDINGS, LLC, Gilbert, AZ (US)

( * ) Notice: Subject to any disclaimer, the term of this patent is extended or adjusted under 35 U.S.C. 154(b) by 54 days.

(21) Appl. No.: 18/620,449

(22) Filed: Mar. 28, 2024

(65) Prior Publication Data

US 2024/0333699 A1     Oct. 3, 2024

Related U.S. Application Data

(60) Provisional application No. 63/455,365, filed on Mar. 29, 2023.

(51) Int. Cl.
| | |
|---|---|
| *H04L 9/40* | (2022.01) |
| *G06F 21/31* | (2013.01) |
| *G06F 40/279* | (2020.01) |
| *G06F 40/40* | (2020.01) |

(52) U.S. Cl.
CPC .............. *H04L 63/08* (2013.01); *G06F 21/31* (2013.01); *G06F 40/279* (2020.01); *G06F 40/40* (2020.01)

(58) Field of Classification Search
None
See application file for complete search history.

(56) References Cited

U.S. PATENT DOCUMENTS

| | | | |
|---|---|---|---|
| 8,104,084 B2 * | 1/2012 | Smithson ................ | G06F 21/33 |
| | | | 713/168 |
| 8,112,817 B2 * | 2/2012 | Chiruvolu ............... | G06F 21/31 |
| | | | 726/28 |
| 8,136,148 B1 * | 3/2012 | Chayanam .............. | G06F 21/34 |
| | | | 715/780 |
| 8,375,420 B2 * | 2/2013 | Farrell .................. | H04L 9/0844 |
| | | | 713/168 |
| 8,380,629 B2 * | 2/2013 | Carlson .................. | G06Q 40/02 |
| | | | 705/1.1 |

(Continued)

OTHER PUBLICATIONS

Nwafor et al., "An Automated Multiple-Choice Question Generation using Natural Language Processing Techniques", International Journal on Natural Language Computing, https://arxiv.org/pdf/2103.14757, Apr. 2021, pp. 1-11.

(Continued)

*Primary Examiner* — Backhean Tiv
(74) *Attorney, Agent, or Firm* — ISNELL & WILMER L.L.P.

(57) ABSTRACT

Exemplary systems and methods utilize unique knowledge-based authentication techniques involving private and/or recent data. Via use of the disclosed concepts, authentication is made more robust, and is hardened against compromise techniques such as those drawing from prior data breaches, public records, and the like. In this manner, simpler and more reliable authentication is achieved.

17 Claims, 14 Drawing Sheets

(56) References Cited

U.S. PATENT DOCUMENTS

| | | | | |
|---|---|---|---|---|
| 8,396,926 | B1 * | 3/2013 | Oliver | G06Q 10/107 |
| | | | | 709/206 |
| 8,533,118 | B2 * | 9/2013 | Weller | G06Q 20/4016 |
| | | | | 705/35 |
| 8,677,466 | B1 | 3/2014 | Chuang et al. | |
| 8,732,089 | B1 * | 5/2014 | Fang | G06Q 20/389 |
| | | | | 705/76 |
| 9,323,930 | B1 * | 4/2016 | Satish | G06F 21/566 |
| 9,591,035 | B2 * | 3/2017 | Kuo | H04L 65/1069 |
| 9,794,228 | B2 * | 10/2017 | Li | H04L 63/0281 |
| 9,813,402 | B1 * | 11/2017 | Chen | H04L 63/08 |
| 9,898,740 | B2 * | 2/2018 | Weller | H04L 9/3273 |
| 9,928,358 | B2 * | 3/2018 | Ghosh | G06Q 20/40 |
| 10,452,826 | B2 * | 10/2019 | Rush | G06V 40/172 |
| 10,999,734 | B1 * | 5/2021 | Alexander | H04L 63/0876 |
| 11,062,014 | B1 * | 7/2021 | Raman | G06N 7/023 |
| 11,068,891 | B2 * | 7/2021 | Ghosh | G06F 21/31 |
| 12,107,972 | B2 * | 10/2024 | Mokhasi | G06Q 20/02 |
| 2005/0268107 | A1 | 12/2005 | Harris et al. | |
| 2006/0165060 | A1 | 7/2006 | Dua | |
| 2009/0259848 | A1 | 10/2009 | Williams et al. | |
| 2010/0121867 | A1 * | 5/2010 | Gosejacob | G06F 16/972 |
| | | | | 707/758 |
| 2011/0302644 | A1 | 12/2011 | Headley | |
| 2012/0124651 | A1 | 5/2012 | Ganesan et al. | |
| 2014/0137219 | A1 * | 5/2014 | Castro | H04L 67/02 |
| | | | | 726/6 |
| 2015/0106216 | A1 * | 4/2015 | Kenderov | G06Q 20/4014 |
| | | | | 705/21 |
| 2015/0188898 | A1 * | 7/2015 | Chow | G06F 21/31 |
| | | | | 726/7 |
| 2015/0249540 | A1 * | 9/2015 | Khalil | H04L 63/18 |
| | | | | 713/158 |
| 2016/0380941 | A1 * | 12/2016 | Tanurdjaja | G06Q 10/10 |
| | | | | 709/205 |
| 2018/0048634 | A1 * | 2/2018 | Fang | G06Q 20/40 |
| 2020/0327432 | A1 * | 10/2020 | Doebelin | G06N 5/02 |
| 2021/0406444 | A1 * | 12/2021 | Vontobel | G06Q 10/10 |
| 2024/0333699 | A1 * | 10/2024 | Narendranathan | H04L 63/08 |

OTHER PUBLICATIONS

Mehta et al., "Automated MCQ generator using natural language processing." Internation Research Journal of Engineering and Technology 8, https://www.irjet.net/archives/V8/15/IRJET-V815497.pdf, May 2021, pp. 2705-2710.

Madri et al., "A comprehensive review on MCQ generation from text", Multimed Tools Appl 82, https://doi.org/10.1007/s11042-023-14768-5, Oct. 2023, pp. 39415-39434.

Das et al., "Multiple-choice question generation with auto-generated distractors for computer-assisted educational assessment", Multimed Tools Appl 80, https://doi.org/10.1007/s11042-021-11222-2, Sep. 2021, pp. 31907-31925.

* cited by examiner

100

110

APPLICATION
PROGRAMMING
INTERFACE

COMPUTING
DEVICE,
BROWSER,
SMART PHONE

112

COMPUTATIONAL
ENVIRONMENT

114

Figure 2B:
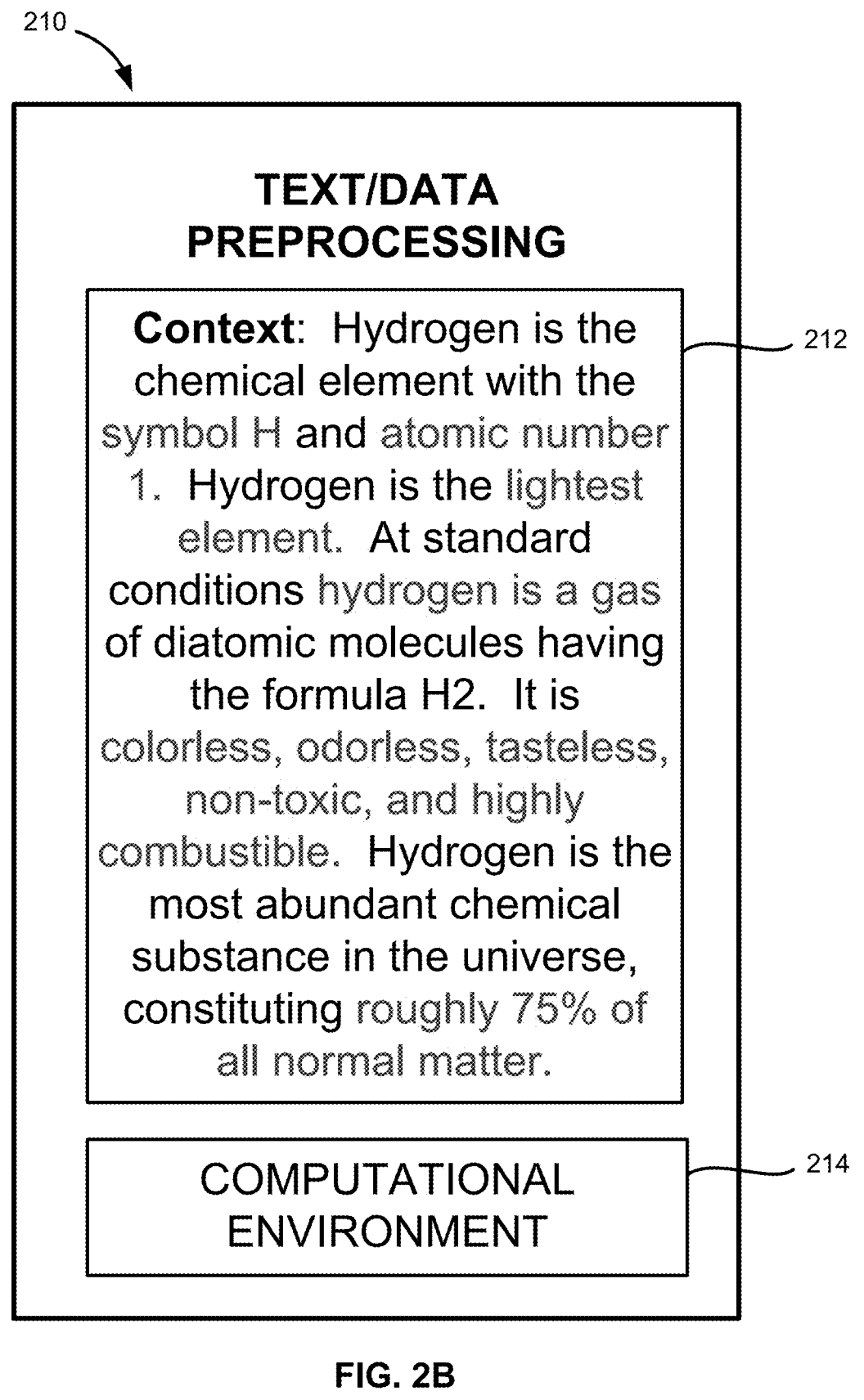

210

TEXT/DATA PREPROCESSING

Context:  Hydrogen is the chemical element with the symbol H and atomic number 1.  Hydrogen is the lightest element.  At standard conditions hydrogen is a gas of diatomic molecules having the formula H2.  It is colorless, odorless, tasteless, non-toxic, and highly combustible.  Hydrogen is the most abundant chemical substance in the universe, constituting roughly 75% of all normal matter.

— 212

COMPUTATIONAL ENVIRONMENT

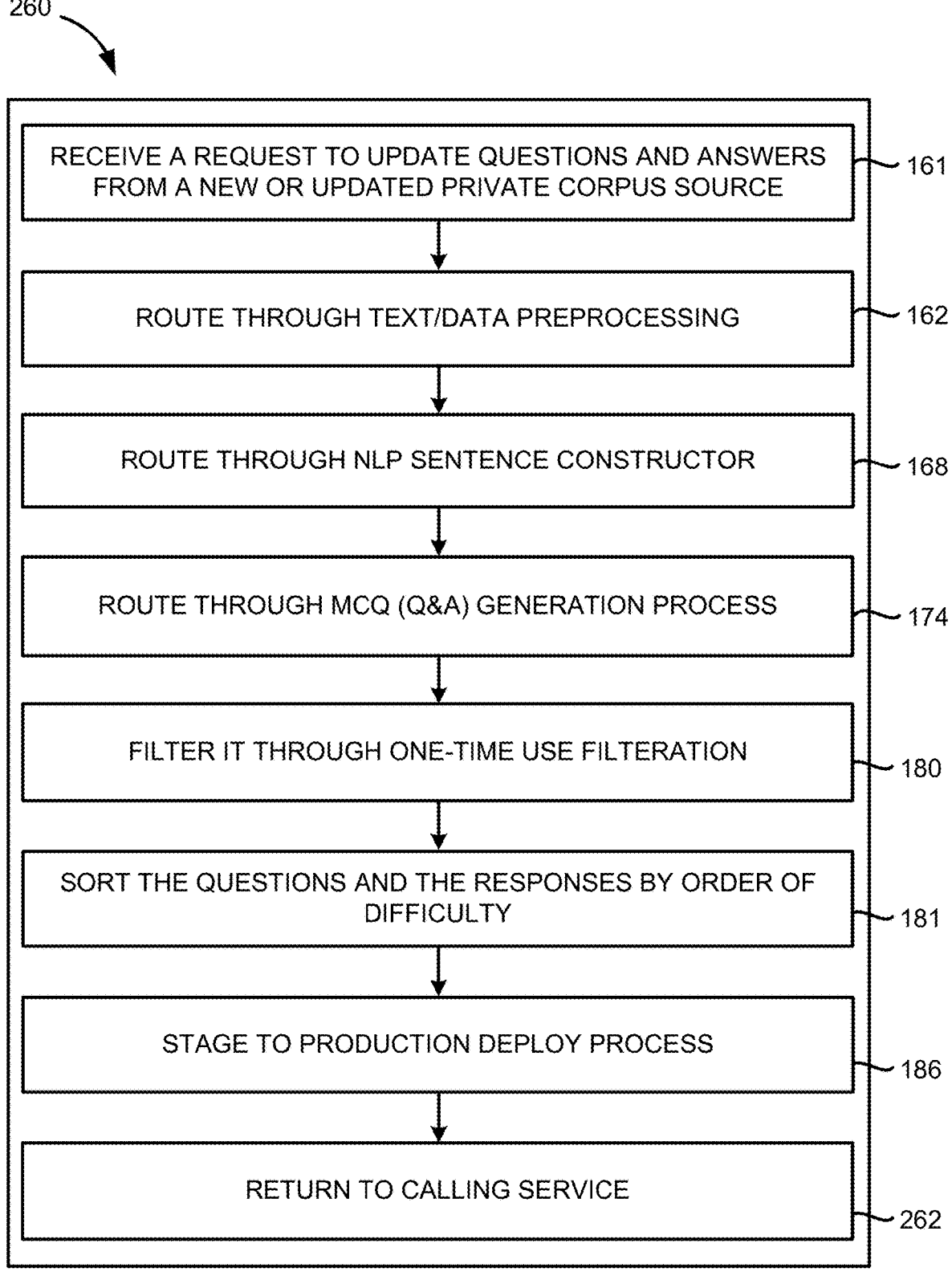

RECEIVE A REQUEST TO UPDATE QUESTIONS AND ANSWERS
FROM A NEW OR UPDATED PRIVATE CORPUS SOURCE — 161

ROUTE THROUGH TEXT/DATA PREPROCESSING — 162

ROUTE THROUGH NLP SENTENCE CONSTRUCTOR — 168

ROUTE THROUGH MCQ (Q&A) GENERATION PROCESS — 174

FILTER IT THROUGH ONE-TIME USE FILTERATION — 180

SORT THE QUESTIONS AND THE RESPONSES BY ORDER OF
DIFFICULTY — 181

STAGE TO PRODUCTION DEPLOY PROCESS — 186

RETURN TO CALLING SERVICE — 262

RECEIVE A REQUEST TO SELECT A QUESTION AND MULTIPLE RESPONSES INCLUDING THE CORRECT ANSWER ⎯197

SELECT A QUESTION FROM A LIST OF QUESTIONS (IN INCREASING ORDER OF DIFFICULTY) ⎯199

ADD QUESTION AND THE MULTIPLE RESPONSES TO THE ONE-TIME LIST FOR FUTURE EXCLUSION ⎯180

RETURN TO CALLING SERVICE ⎯272

170

READ A RECORD FROM A PRE-CONFIGURED CORPUS FOR THIS USER

297

USING PRE-IDENTIFIED TAGS, AND GENRE TABLE FOR THE DATA SET, CONSTRUCT A HUMAN READABLE SENTENCE

299

CONTINUE TO GENERATE SENTENCES AND BUILD UP THE STORY UNTIL THERE ARE NO MORE RECORDS TO READ

280

RETURN TO CALLING SERVICE

372

Raw FHIR Data in JSON Format

```
{
  "status" : "completed",
  "dosage" : {
    {
      "text" : "Take 1 tablet by mouth 2 times a day with a meal",
      "timing" : {
        "repeat" : {
          "boundsPeriod" : {
            "start" : "2023-02-22",
            "end" : "2023-02-22"
          }
        }
      }
    }
  },
  "patient" : {
    "display" : "Doe, John",
    "reference" : "https://kpx-service-
bus.kp.org/service/kpx/v1/api/FHIR/DSTU2/Patient/TWMC123ac2YjX
HRD-.uVBDlBvgZQECvxfwaLUdozzzuWrUSQQEB"
  },
  "id" : "TTf-wogE-TNal9ATHKqGklll4FGtegOUl-6LohF9HL5cB",
  "effectivePeriod" : {
    "start" : "2023-02-22",
    "end" : "2023-02-22"
  },
  "medicationCodeableConcept" : {
    "text" : "metFORMIN 500 mg 24hr sr tab",
    "coding" : [
      {
        "system" : "http://www.nlm.nih.gov/research/umls/rxnorm",
        "display" : "metFORMIN 500 mg 24hr sr tab",
        "code" : "860975"
      }
    ]
  },
  "identifier" : [
    {
      "use" : "usual",
      "system" : "urn:oid:1.2.840.114350.1.13.120.2.7.2.79826.1.28",
      "value" : "1875864104"
    },
    {
      "use" : "usual",
      "system" : "urn:oid:1.2.840.114350.1.13.120.2.7.3798268.801",
      "value" : "1875864104:2334047590"
    }
  ],
  "informationSource" : {
    "display" : "MISTER  PHYSICIAN MD",
    "reference" : "https://kpx-service-
bus.kp.org/service/kpx/v1/api/FHIR/DSTU2/Practitioner/TH32V6knhsiV
-4ERCzMz6OcQOAzop6le6qKOW7H8RzFoB"
  },
  "extension" : [
    {
      "url" : "http://hl7.org/fhir/3.0/StructureDefinition/extension-
MedicationStatement.category",
      "valueCodeableConcept" : {
        "text" : "Community",
        "coding" : [
          {
            "system" : "http://hl7.org/fhir/medication-statement-category",
            "display" : "Community",
            "code" : "community"
          }
        ]
      }
    }
  ],
  "resourceType" : "MedicationStatement"
}
```

Sentence constructed to tell a story in plain English

Patient *Doe, John,* on 2023-02-22 was prescribed to take "metFORMIN 500 mg 24hr sr tab" *tablet by mouth 2 times a day with a meal* by physician *MISTER PHYSICIAN MD.*

FIG. 2H

Credit Card Data

| Date | Repeating | Merchant | Amount |
|---|---|---|---|
| Saturday, January 11, 2020 | N/A | Guardian On-Line | $ 8.00 |
| Saturday, February 08, 2020 | 28 Days | Guardian On-Line | $ 8.00 |
| Saturday, March 07, 2020 | 28 Days | Guardian On-Line | $ 8.00 |
| Saturday, April 04, 2020 | 28 Days | Guardian On-Line | $ 8.00 |
| Saturday, May 02, 2020 | 28 Days | Guardian On-Line | $ 8.00 |
| Saturday, May 30, 2020 | 28 Days | Guardian On-Line | $ 8.00 |
| Saturday, June 27, 2020 | 28 Days | Guardian On-Line | $ 8.00 |
| Saturday, July 25, 2020 | 28 Days | Guardian On-Line | $ 8.00 |
| Saturday, August 22, 2020 | 28 Days | Guardian On-Line | $ 8.00 |
| Saturday, September 19, 2020 | 28 Days | Guardian On-Line | $ 8.00 |
| Saturday, October 17, 2020 | 28 Days | Guardian On-Line | $ 8.00 |
| Saturday, November 14, 2020 | 28 Days | Guardian On-Line | $ 8.00 |
| Saturday, December 12, 2020 | 28 Days | Guardian On-Line | $ 8.00 |

Sentence constructed to tell a story in plain English

Credit card customer has a repeating charge for a subscription with _Guardian_ every _28_ days for the amount of _$8.00_

FIG. 2I

| Source Corpus | Question | Answer set (including detractors) | Correct answer |
| --- | --- | --- | --- |
| Calendaring Corpus (e.g., formats .ical, .ics, .ifb, .icalendar, etc.) | What is the date and time of your meeting next week with Jack Henry Associates? | a. Monday 03/25/24 @ 9:30am<br>b. Wednesday 03/27/24 @ 6:30am<br>c. Thursday 03/28/24 @ 10:30am<br>d. Friday 03/29/24 @ 6:05pm | d. Friday 03/29/24 @ 6:05pm |
| FHIR JSON Heathcare Records | What is the name of the cholesterol medication you take every day? | a. Atorvastatin (Lipitor)<br>b. Fluvastatin (Lescol)<br>c. Lovastatin (Mevacor)<br>d. Rosuvastatin (Crestor) | d. Rosuvastatin (Crestor) |
| Credit card / Banking Transactions Corpus (CSV format) | What is the name of a news subscription you pay monthly on your American Express Platinum Card? | a. Washington Post<br>b. Chicago Tribune<br>c. Sacramento Bee<br>d. Guardian | d. Guardian |
| FHIR JSON Heathcare Records | Your last prescription was for? | a. Metoprolol<br>b. Metformin<br>c. Metronidazole<br>d. Methotrexate | b. Metformin |
| Credit card / Banking Transactions Corpus (CSV format) | What was the amount of your last credit card charge at Chevron Station San Ramon? | a. $25.89<br>b. $37.32<br>c. $48.93<br>d. $115.87 | d. $115.87 |
| Mobile Carrier Geo-Location Data Corpus (with Commercial/Business Locations Tagged) | What is the name of the grocery store you frequent very often? | a. Trader Joe<br>b. Vons<br>c. Sprouts Farmers Market<br>d. Safeway | c. Sprouts Farmers Market |

FIG. 2J

DYNAMIC ONE-TIME USE KNOWLEDGE-BASED AUTHENTICATION VIA MULTI-SOURCED PRIVATE DATA USING ARTIFICIAL INTELLIGENCE TECHNIQUES

CROSS-REFERENCE TO RELATED APPLICATION

This application claims priority to, and the benefit of, U.S. Provisional Patent Application No. 63/455,365 filed on Mar. 29, 2023 entitled "Dynamic One-time Use Knowledge-Based Authentication Via Multi-Sourced Private Data Using Artificial Intelligence Techniques." The disclosure of the foregoing application is incorporated herein by reference in its entirety, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates to authentication, and particularly to authentication using knowledge-based techniques.

BACKGROUND

Traditional access management systems can be vulnerable to various threats and attacks, such as: (i) weak passwords (users may choose passwords that are easy to guess or crack, due to lack of password complexity requirements); (ii) password reuse (users using the same password across multiple accounts, increasing the risk if one account is compromised); (iii) password storage (inadequate protection of stored passwords, such as storing them in plaintext rather than using secure hashing); (iv) phishing attacks (users might fall victim to phishing emails or websites that trick them into revealing their credentials); (v) brute force attacks (automated attempts to guess passwords through trial and error); (vi) credential stuffing (attackers use known username and password combinations obtained from breaches on other platforms to gain unauthorized access); (vii) insider threats (malicious actions or unintentional mistakes made by individuals within the organization); (viii) social engineering (manipulating individuals into divulging confidential information or performing actions that compromise security); (ix) SIM swap attacks (unauthorized individuals convincing a mobile carrier to transfer a user's phone number to a new SIM card, allowing them to intercept authentication codes); (x) session hijacking (intercepting and taking over an active session, often through the theft of session cookies); (xi) man-in-the-middle (MitM) attacks (interception of communication between two parties, allowing attackers to eavesdrop or modify data); and/or (xii) overly permissive access rights (users or systems having more permissions than necessary, increasing the potential impact of a compromise). Accordingly, improved approaches for authentication, access management, and/or the like remain highly desirable.

SUMMARY

Authentication systems and methods are disclosed herein. In an exemplary embodiment, a computer-based system comprises a processor, and a tangible, non-transitory memory configured to communicate with the processor, the tangible, non-transitory memory having instructions stored thereon that, in response to execution by the processor, cause the processor to perform operations comprising: receiving, by the processor, a user validation data; validating, by the processer, a user based on the user validation data to identify a validated user; receiving, by the processor, a request for service from the validated user; and providing, by the processor and in response to the request for service, a knowledge-based authentication service, wherein the knowledge-based authentication service utilizes a private corpus of data, a text/data preprocessing process module, a story telling process module, a multiple-choice generation process module, a keyword extractor and sentence mapping module, a nearest-neighbor one-time use matching module, a distractor lookup table, and a multiple choice questions (MCQ) ontology, taxonomy table.

The operations may further comprise generating, by the processor, a data taxonomy based on the private corpus data from a plurality of documents; applying, by the processor, a natural language processing (NLP) algorithm to the private corpus data to generate an output; forming, by the processor, a data taxonomy with text and data pre-processing based on the output of the NLP algorithm; associating, by the processor, the data taxonomy with the story telling process module; and generating, by the processor, a NLP sentence constructor based on the data taxonomy and the story telling process module.

The operations may further comprise applying, by the processor and via the NLP sentence constructor process module, a story telling process to the data taxonomy; deriving, by the processor, the extractive summarizer keyword extractor based on the sentence mapping process; capturing, by the processor and via the NLP sentence constructor module, a plurality of storytelling processes; associating, by the processor, the NLP sentence constructor module with the storytelling processes; and generating, by the processor and via the NLP sentence constructor module, a storytelling processes update.

In another exemplary embodiment, a computer-implemented method for passwordless authentication comprises receiving, at a computer-based authentication system, a private corpus of data associated with a user; processing, by the authentication system, the private corpus to generate a set of challenge questions; receiving, at the authentication system and over a network, a request for authentication from a user device associated with the user; and delivering to the user device, via the network, a first challenge question from the set of challenge questions.

The method may further comprise, responsive to receiving, over the network and from the user device, the correct answer to the first challenge question, authenticating the user. The private corpus of data may comprise data regarding events taking place within a predetermined time frame prior to the receiving. The predetermined time frame may be less than one week, or less than two weeks, or less than one month. The private corpus of data may comprise at least one of credit card transactions for a credit card of the user, geolocation data for the user device, healthcare records associated with the user, or calendar appointment information for the user. The first challenge question may comprise a zero-knowledge proof.

The processing may comprise: reading a first record from the private corpus of data; using pre-identified tags, and using a genre table for the data set, constructing a human-readable sentence based on the first record; and repeating the reading and constructing steps until a human-readable sentence has been constructed for each record in the private corpus of data. The method may further comprise, responsive to receiving, over the network and from the user device, an incorrect answer to the first challenge question, delivering to the user device, via the network, a second challenge question from the set of challenge questions. The second challenge question may be configured with higher difficulty than the first challenge question. The method may further comprise flagging, in the set of challenge questions, the first challenge question and the second challenge question to prevent reuse of the first challenge question and the second challenge question. The method may further comprise deleting the flagged challenge questions from the set of challenge questions.

The first challenge question may be a multiple-choice question. The method may further comprise receiving, at the authentication system and over the network, update data associated with the user; adding, by the authentication system, the update data to the private corpus of data; processing, by the authentication system, the update data to generate additional challenge questions; and adding, by the authentication system, the additional challenge questions to the set of challenge questions. The processing may further comprise annotating, in the set of challenge questions, each challenge question with a use-by date by which the challenge question should be used or discarded. Each record in the private corpus of data may have a generation date, and the use-by date may be a predetermined number of days from the generation date of the record in the private corpus from which the associated challenge question was generated. The method may further comprise deleting, from the set of challenge questions and by the authentication system, at least one challenge question having a use-by date prior to the current date. The method may further comprise, responsive to the authenticating, at least one of deleting the first challenge question from the set of challenge questions or flagging the first challenge question to prevent re-use.

The contents of this section are intended as a simplified introduction to the disclosure and are not intended to limit the scope of any claim. The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain exemplary principles of the disclosure.

FIG. 2B illustrates subcomponents of an exemplary question-answer generating system, in accordance with various embodiments.

FIG. 2E illustrates a process flow for processing or refreshing a new body of corpus for question generation, in accordance with various embodiments.

FIG. 2H illustrates how a sentence (as part of a story telling process) is created from healthcare data private corpus, in accordance with various embodiments.

FIG. 2I illustrates how a sentence (as part of a story telling process) is created from credit card or banking transaction data private corpus, in accordance with various embodiments.

FIG. 2J illustrates exemplary multiple choice questions and answer generation for different private data corpuses, in accordance with various embodiments.

DETAILED DESCRIPTION

Figure 1A:
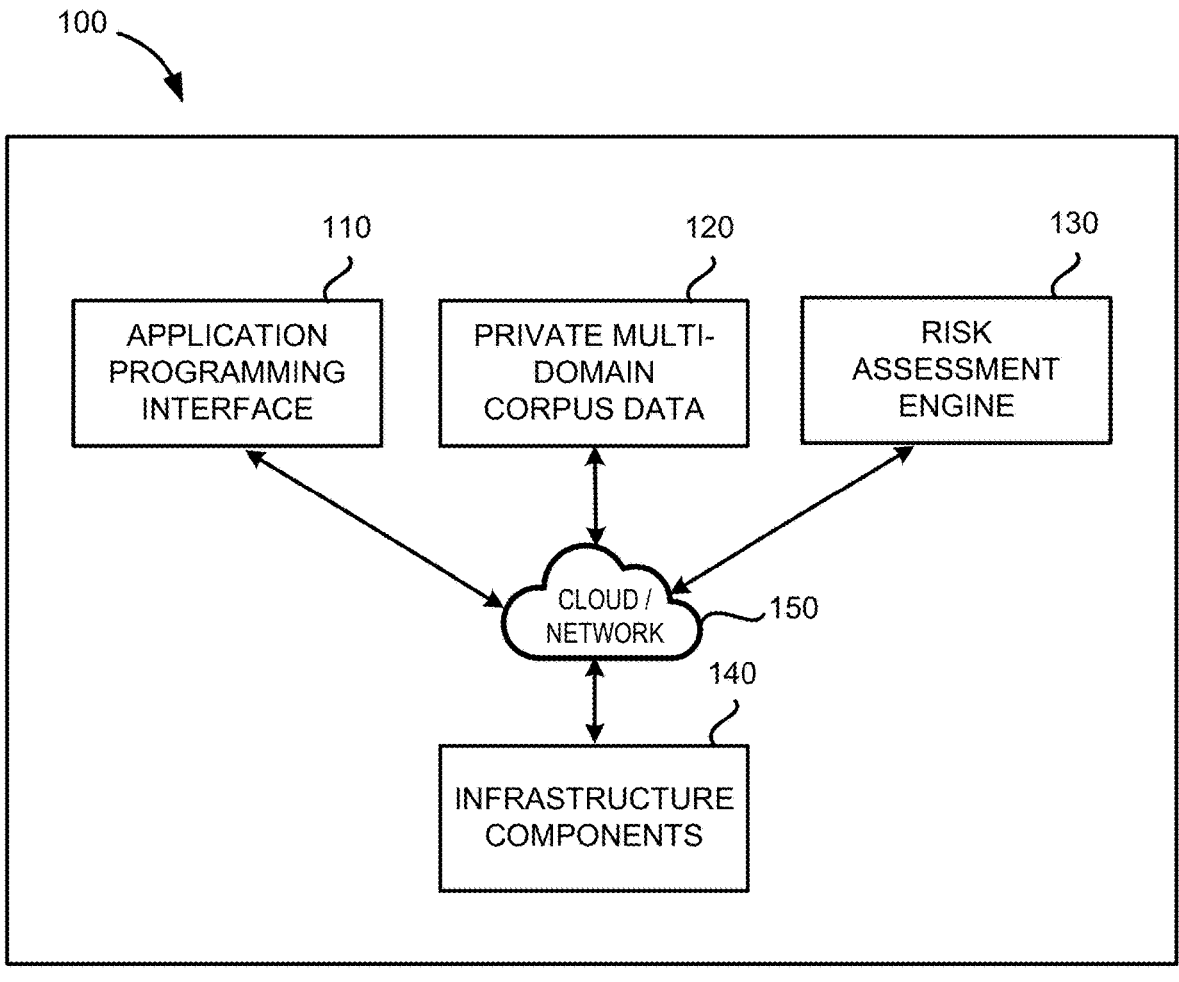
FIG. 1A illustrates a block diagram of a system for passwordless authentication services, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that structural, logical, communicative, or similar changes may be made without departing from the spirit and scope of the disclosure. Thus, the detailed description herein is presented for purposes of illustration only and not of limitation.

For example, the steps recited in any of the method or process descriptions may be executed in any suitable order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. An individual component may be comprised of two or more smaller components that may provide a similar functionality as the individual component. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Use of 'a' or 'an' before a noun naming an object shall indicate that the phrase be construed to mean 'one or more' unless the context sufficiently indicates otherwise, as set forth in Slip op. at 8-9 (Fed. Cir. Oct. 19, 2023) (citing Baldwin Graphic Sys., Inc. v. Siebert, Inc., 512 F.3d 1338, 1342-43 (Fed. Cir. 2008)). For example, the description or claims may refer to a processor for convenience, but the invention and claim scope contemplates that the processor may be multiple processors. The multiple processors may handle separate tasks or combine to handle certain tasks. Although specific advantages have been enumerated herein, various embodiments may include some, none, or all of the enumerated advantages. A "processor" may include hardware that runs the computer program code. Specifically, the term 'processor' may be synonymous with terms like controller and computer and should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices.

In various exemplary embodiments, an access management system is disclosed that can employ multi-factor authentication (MFA) using multiple types of authentications. In at least one embodiment, techniques may include implementing Multi-Factor Authentication (MFA) including knowledge-based authentication (KBA). MFA may be based on multiple factors, such as "what you know" (e.g., a password or an answer to a question known by a user) or "what you have" (e.g., a trusted device registered for a user) or "what you are" (biometric authentication based on finger print, voice print, facial recognition, and other). In at least one embodiment, multiple devices (e.g., a desktop computer and a mobile device) may be utilized to provide for stronger authentication using a combination of what a user has. The combination of MFA based on what you know (e.g., KBA) and what you have (e.g., a trusted device) may further ensure authentication is not compromised. The techniques disclosed herein may provide for a stronger form of authentication to reduce, if not eliminate, possible vulnerabilities for traditional access management.

Powerful search engines with Large Language Models (LLMs) and Large Multi-Modal Models (LMMs) can potentially impact the vulnerabilities of traditional access management in several ways, for example:

Enhanced Attack Techniques: Sophisticated natural language queries generated by LLMs can be used to craft more convincing phishing emails, increasing the likelihood of successful social engineering attacks.

Improved Password Cracking: LLMs can be used to generate context-aware and targeted password cracking attempts, making it more challenging to defend against brute force attacks.

Advanced Phishing Attacks: Attackers can leverage LLMs to generate highly convincing and contextually relevant phishing messages, making it harder for users to discern between legitimate and malicious communications.

Automated Vulnerability Discovery: LLMs can be employed to automatically discover and exploit vulnerabilities in access management systems by analyzing text-based documentation, code repositories, or security advisories.

More Effective Social Engineering: LLMs can assist attackers in crafting personalized and contextually relevant social engineering attacks, increasing the chances of successfully tricking individuals into divulging sensitive information.

Context-Aware Impersonation: LLMs can assist attackers in creating more contextually accurate impersonation attempts, such as mimicking the writing style of a legitimate user or administrator to bypass security measures.

Abuse of Knowledge Bases: Attackers can exploit the vast amount of information stored in LLMs to gather intelligence about an organization's employees, technologies, and procedures, facilitating targeted attacks.

Enhanced Credential Stuffing: LLMs can aid attackers in generating more realistic and context-aware credential stuffing attacks by simulating natural interactions and behavior patterns.

Spear Phishing with Improved Context: LLMs can generate spear phishing messages with improved context, allowing attackers to tailor their messages based on the latest information available about a target.

Understanding Security Measures: LLMs can be used to analyze and understand security measures implemented by organizations, potentially finding weaknesses or loopholes that can be exploited.

Biometrics- or token-based (MFA) authentication may attempt to address the foregoing, but are not always available to everybody, everywhere and every time, especially to road warriors (or consumer sites). Moreover, it is desirable that a user experience is as friction free (lowest common denominator) as possible, without increasing the risk profile.

Accordingly, in various embodiments authenticating users is performed based on answers to challenge questions relating to a "tracked user's" location history (that is, places the tracked user is known to have been). The "questioned user" may or may not be the same as the "tracked user." Some embodiments of the present disclosure are directed to generating questions to questioned users based on answers to challenge questions about aspects (for example, value and/or venue) of a desired transaction for which authentication is requested.

Various prior approaches for authentication include U.S. Patent Application Publication 2005/0268107 ("System and Method for Authenticating Users Using Two or More Factors"), U.S. Patent Application Publication 2006/0165060 ("Method and Apparatus for Managing Credentials Through A Wireless Network"), U.S. Patent Application Publication 2009/0259848 ("Out of Band System and Method for Authentication"), U.S. Patent Application Publication 2011/0302644 ("Multi-Channel Multi-Factor Authentication"), U.S. Patent Application Publication 2012/0124651 ("Secure and Efficient Authentication Using Plug-In Hardware Components"), U.S. Pat. No. 8,677,466 ("Verification of Digital Certificates Used for Encrypted Computer Communications"), and U.S. Pat. No. 9,537,661 ("Password-less Authentication Service"). The disclosure of the foregoing applications is incorporated herein by reference in its entirety, including but not limited to those portions that specifically appear hereinafter, but except for any subject matter disclaimers or disavowals, and except to the extent that the incorporated material is inconsistent with the express disclosure herein, in which case the language in this disclosure shall control.

In various exemplary embodiments, an exemplary system is a trusted enterprise class application providing a dynamic, one-time, multi-purpose authentication challenge without a password or password-less. For this novel form of Privileged Access Management (PAM), the system utilizes end-user based sources forming a private corpus of data as a basis to drive one-time intelligent Knowledge Based Authentication (KBA) challenge/response processes, created through Artificial Intelligence/Machine Learning (AI/ML) methods. The data is controlled and authorized for system use by the end-user, and is private, confidential, non-public, and resilient to data discovery from powerful search engines or large language/large multi-modal models (LLM/LMMs)—extending beyond today's Out-of-Wallet (OoW) data sources. The exemplary system includes anti-fraud measures against widely known threats such as social engineering, phishing, gaming, or playback, and others incorporated for value-based transactions that utilize password-less authentication. Password-less based transactions may include, but are not limited to, sign-on or login experiences, high value transactions, password recovery, or sensitive systems administration roles.

This disclosure pertains generally to dynamic authentication of computer users, and more specifically to using personalized knowledge based authentication questions are generated from analytics stream data (where personal computing device analytics used as a knowledge based authentication source) as well as personalized knowledge based authentication questions are generated from private, not publicly available, and recent corpus data (e.g., combination of any of credit-based, clinical-based, calendar entry-based, or claims-based information) using artificial intelligence and/or machine learning techniques.

Illustrative methods, processes, and software remotely authenticate individuals fully compliant with authentication policies. In various embodiments, a system receives a request to verify an identity from an applicant device. The request includes an identification for an application or data to which access is desired. Then, the system receives any combination of credit-based, clinical-based, calendar entry-based, and/or claims-based information corresponding to an applicant identified in the received request; sends to the applicant device one or more queries related to the received combination according to one or more identity authentication requirements; receives, from the applicant device, one or more responses to the one or more queries where the one or more response comprise authentication information; determine a match between the authentication information and the received combination of any of credit-based, clinical-based, calendar entry-based, and claims-based information; and, based on the determination of the match, grants access to the desired application to the applicant device.

Authenticating users before allowing access to secure computer systems and websites is highly desirable. Online services such as banking, bill payment, social networking, and e-commerce utilize ever increasing amounts of personal and financial user data online. Identity thieves and other malicious parties use a wide variety of techniques to attempt to gain unauthorized access to the accounts of innocent parties to commit financial fraud, obtain personal information, and otherwise harm the interests of legitimate account owners and service providers. Properly authenticating users attempting to access online services and the like protects against such fraud, whereas insufficient authentication creates vulnerabilities.

Password authentication, in which the only authentication factor a user needs to provide is a password, is relatively weak. The types of passwords commonly utilized are fairly easy to crack, whereas strong passwords are difficult for users to remember and hence are rarely used at all, or else are written down in accessible locations. These problems are compounded by the number of separate password authenticated accounts most users need to maintain. For these reasons, many authentication systems extend password authentication schemes by requiring one or more additional factor(s) for added security. In multifactor authentication, the user must present multiple authentication factors of different types to access a service. For example, in two-factor authentication, a user must provide two factors, such as something the user knows (e.g., a password or PIN) and something the user has, which is referred to as a possession factor. Examples of possession factors include a onetime passcode generated by a registered personal smartphone, a hardware token generated random number, a onetime pad, a magnetic stripe card, etc. In general, multifactor authentication is much harder to crack than password only authentication.

Unfortunately, the possession factor (the thing the user has) may be lost, misplaced, stolen, damaged or destroyed. Without the possession factor, users cannot connect to their authentication protected systems, in which case they may lose access to their accounts and data. Some systems allow users to reset their possession factor credentials by answering challenge questions provided when the account was created (e.g., what is your mother's maiden name, zip code, city of birth, etc.). These are referred to as Knowledge Based Authentication (KBA) questions. However, the answers to conventional KBA questions can be guessed or learned by fraudulent parties relatively easily, for example by reviewing social networking sites and public records. Some systems attempt to validate users by automatically creating KBA questions based on the account the user tries to recover (e.g., when was the account created, whom do you email most often, etc.). As with KBA questions selected by users, system created KBA questions can generally be guessed based on publicly available information. Allowing users to reset their possession factor credentials through these insecure bypass mechanisms undermines the security benefit provided by the possession factor in the first place. It remains highly be desirable to address these issues.

Accordingly, in various exemplary embodiments, in response to an authentication request from a user (e.g., a request to re-authenticate possession factor credentials), the user can be prompted to answer a given number of current dynamic, personalized knowledge-based authentication questions. In one embodiment, the user is prompted to answer authentication questions based on data in a received analytics stream corresponding to monitored activity that occurred on the mobile computing device within a requisite period of time prior to the generation of the question(s). Where the mobile computing device is a possession factor device which the user reports lost or stolen, this period of time can exclude the most recent portion of the received analytics stream. It can be determined whether to authenticate the user (e.g., whether to reset the user's possession factor credentials) in response to whether the user correctly answers a requisite number of current dynamic, personalized knowledge-based authentication questions. In another embodiment, the user is prompted to answer authentication questions based on a corpus of pre-selected user data that is received corresponding to a combination of, for example, any of credit-based, clinical-based, calendar entry-based, or claims-based information, that is used to generate KBA questions and answers using Artificial Intelligence and Machine Learning techniques. It can be determined whether to authenticate the user (e.g., whether to reset the user's possession factor credentials) in response to whether the user correctly answers a requisite number of current dynamic, personalized knowledge-based authentication questions.

In this regard, exemplary systems and techniques disclosed herein have the capability to cross many sectors, such as financial services, healthcare, consumer, e-Commerce, payments, risk management, and government (civilian, military, and other levels of secrecy classifications), yet such techniques are essentially unlimited in terms of application authentication domains, as knowledge-based authentication techniques have unbounded levels of applicability to problem spaces. In addition, the system substantiates the decision support capabilities in manual, augmented, or fully automated implementation scenarios.

It will be appreciated that various exemplary embodiments improve the functioning of computing systems, computer networks, and the like, for example by making the systems more secure, by reducing the amount of sensitive data transmitted over a network, and so forth.

Moreover, various exemplary embodiments utilize use Zero Knowledge Proofs (ZKPs) which are cryptographic protocols that enable one party (the prover) to prove to another party (the verifier) that a statement is true, without revealing any information about the statement itself. In essence, ZKPs allow for verification of knowledge without disclosing the knowledge itself. It is a privacy-preserving protocol, especially useful when the answer(s) returned can be deemed private and sensitive. In privacy protection, a zero-knowledge proof can be utilized to authenticate a user's identity or verify their credentials without exposing sensitive information. For instance, in a scenario where a user needs to prove they are of legal drinking age without revealing their exact birthdate, a zero-knowledge proof can be employed to verify their age without disclosing the specific date of birth. This preserves the user's privacy while still allowing them to access age-restricted services or products. Additionally, in privacy protection, zero-knowledge proofs can be utilized to authenticate identities or verify credentials without disclosing sensitive information. For instance, in a scenario where a user wants to prove they are of legal drinking age without revealing their exact birthdate, a zero-knowledge proof may be employed to demonstrate that their birthdate falls within the acceptable range without divulging the specific date. This preserves the user's privacy while still allowing them to access age-restricted service.

Accordingly, in various embodiments and with reference to FIG. 1A, a system 100 for Dynamic One-time Use Knowledge-Based Authentication Services is depicted as a block diagram of functional modules, encompassing computing devices, software modules, networks, and data structures in communication. System 100 may also contemplate or be suitable for uses in web services, utility computing, security solutions, cloud computing, mobility, open source, biometrics, and the like. System 100 may comprise a user interface module 110, a multi-domain private corpus data module 120, a risk scoring module 130, and infrastructure components 140, including immutable storage and a secured cloud network 150.

System 100 may be computer-based, and may include a processor, tangible non-transitory computer-readable memory, and a network interface. Instructions in the memory enable various functions. In different embodiments, cloud network 150 may serve as a central hub, providing access to systems, engines, and components, in communication with modules 110, 120, 130, and/or infrastructure components 140.

Users may interact with functional modules of system 100 through a application program interface (API) module 110. The system's workflow may include, and be orchestrated across, computing devices via the API module 110. The system 100 may perform pre- and post-production conformity assessments across private and public corpuses through module 120. Infrastructure components 140 may include immutable storage, secure enclave, reporting, analytic tools, and time sources in various embodiments.

As used herein, the term "network" includes any cloud, cloud computing systems or electronic communication system or method that incorporates hardware and/or software components. Communication among the parties may be accomplished through any suitable communication channels, such as, for example, Internet, Quantum Internet, satellite, or wireless communications. Moreover, although the system is frequently described herein as being implemented with TCP/IP communications protocols, the system may also be implemented using any tunneling protocol (e.g., IPsec, SSH), or any number of existing or future protocols.

In various embodiments, cloud network 150 may comprise a highly networked scalable Software as a Service (SaaS) cloud platform solution. In various embodiments, the authentication application can be deployed on-premises, provided by a SaaS service provider, cloud provider, and/or any combination thereof. Exemplary system methods include modern implementation techniques based on JSON and REST. However, the present disclosure is not limited to these embodiments, as other embodiments can be used to practice exemplary principles of the present disclosure.

Figure 1B:
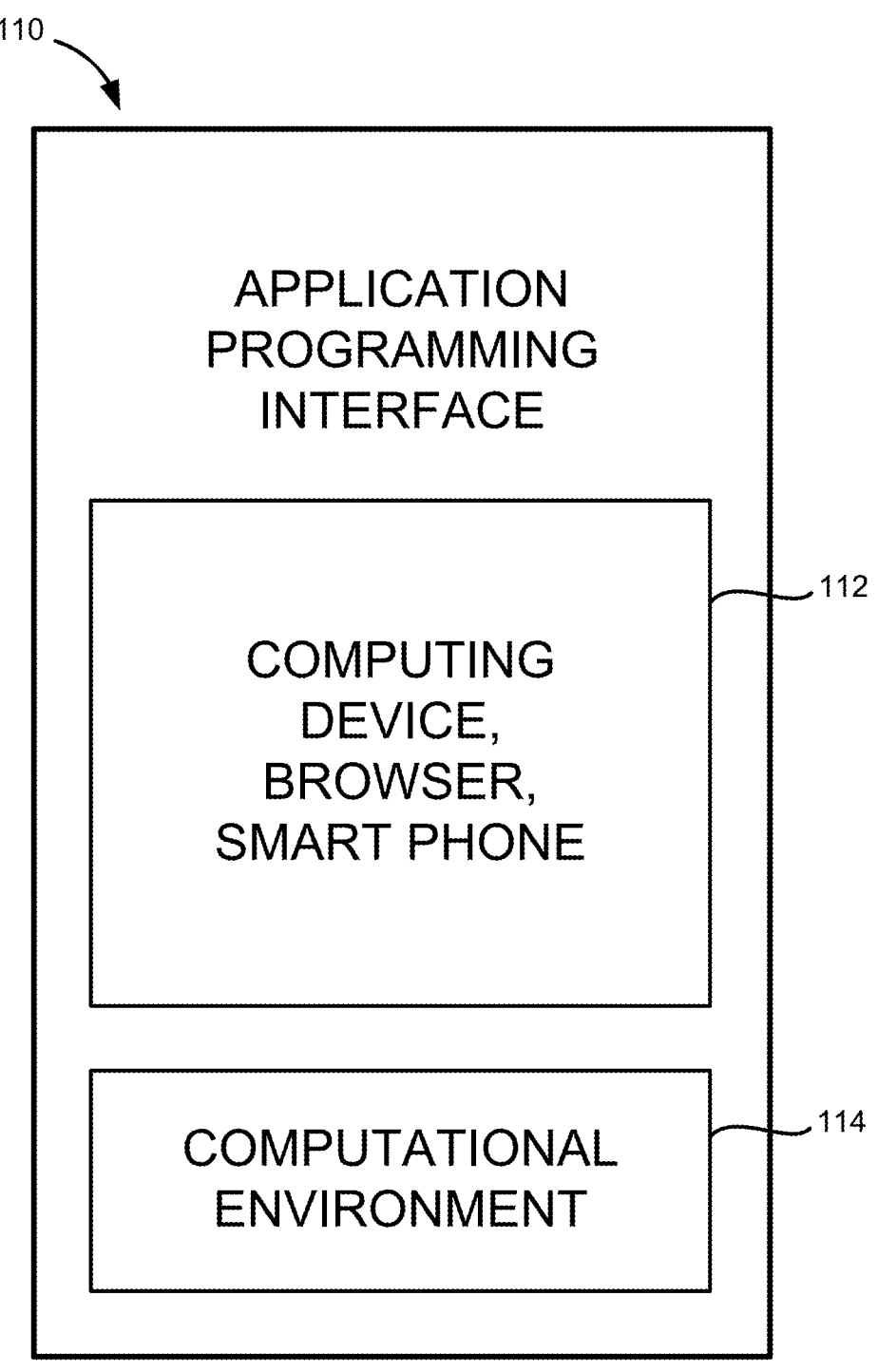
FIG. 1B illustrates an application programming interface (API) module of an exemplary system, in accordance with various embodiments.

With additional reference to FIG. 1B, user interface module 110 comprises an application programming interface, which may include or utilize various computing devices configured to communicate via cloud network 150. In various embodiments, module 110 comprises a computing device 112 and/or a computational environment 114 which may take the form of a computer or processor, or a set of computers/processors, although other suitable types of computing units may be used. Exemplary computing devices and supporting user interfaces include browsers, servers, clustered and/or pooled servers, laptops, notebooks, handheld computers, personal digital assistants, cellular phones, smart phones, or any other device capable of receiving data over networks.

In various embodiments, the computational environment 114 may include multiple commercial and open-source technical tools, computer programming languages, code libraries, collaboration techniques, including fundamental source code management technologies, AI/ML development languages and environments (i.e., computational notebooks for model development and data science purposes), cloud-based containers, cybersecurity controls, data privacy techniques, and/or the like-forming a systematic development view which may be referred to herein as "AI Model-Ops."

Computational environment 114 may incorporate computational browsers as an element of a computation environment that provides the ability to capture a computational narrative (supplement developer code and data with analysis, transparency, hypothesis, requirements, and compliance/regulatory chronicles). System features may include reproducibility, documentation, versioning, and provenance (code, parameters, and data) that enable developers with collaborative functionality, observability and visualization, workflow, providing reactivity (development, testing, and code changes and data modifications), for compliance purposes.

Figure 1C:
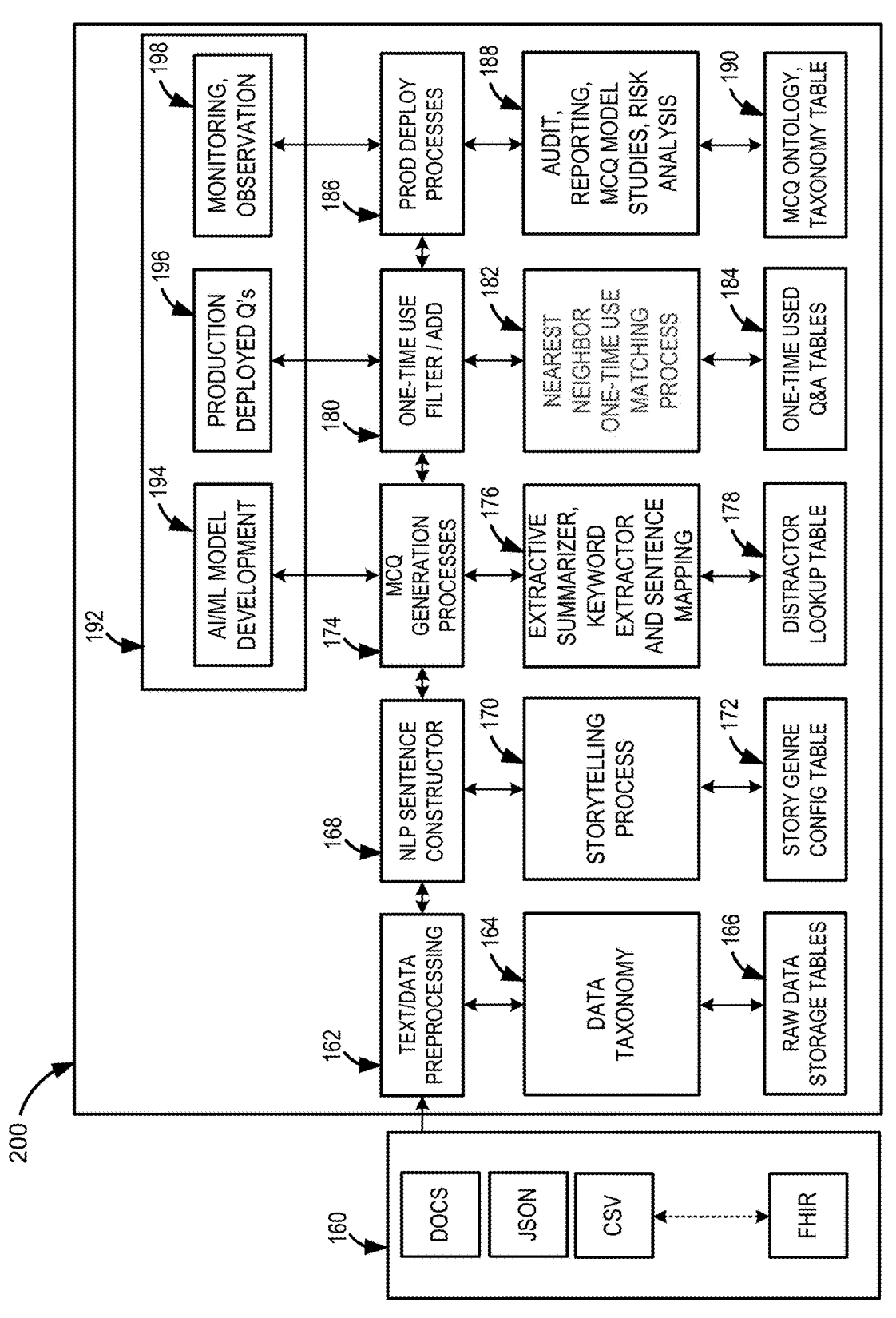
FIG. 1C illustrates a block diagram of exemplary components of a system for project accountability services, in accordance with various embodiments.

In various embodiments and with additional reference to FIG. 1C, a block diagram of an integrated process modules and end-to-end system processes of system 100 is illustrated. Text/Data Preprocessing process 160 represents documents and data that are exemplars of private corpus, information, and data sources of many types, such as medical records, financial transaction records, media consumption records, or the like. For example, Text/Data Preprocessing process 160 may originate from many forms, such as but not limited to multi-domain, multi-national, and multi-sector documents, and data. It is expected by those skilled in the art, that they understand private corpus data management (such as specialized areas of medicine and or other domains) is driven by language, logic, and conceptual ontology and taxonomy-based relationships. Accordingly, Text/Data Preprocessing process 160 ingests and serve as inputs to the generation of a data taxonomy of private corpus data.

In addition to and/or as an alternative to private corpus data, system 100 may utilize streaming data in order to generate questions, for example based on device geo-location data (such as the identification of a gas station, grocery store, restaurant, library, or other location frequently visited by the user). Streaming data may be obtained and/or integrated, for example, from a telecom provider, internet services provider, and/or the like.

In various exemplary embodiments, the authentication and authorization mechanisms used for API invocation on behalf of a user (during process 160 ingestion) can vary based on the architecture and requirements of the calling authentication application and the system and location of private corpus data. However, one common and widely adopted approach is OAuth 2.0. OAuth 2.0 is an open standard for access delegation and authorization, and can be used to enable secure API access on behalf of users. OAuth 2.0 can also be used for user-centric scenarios where applications need access to a user's data on their behalf. It decouples the authentication and authorization processes, allowing for more flexible and secure access to resources. Additionally, OpenID Connect (OIDC) can also be used in conjunction with OAuth 2.0 to provide identity information about the authenticated user. OIDC is a simple identity layer on top of OAuth 2.0 and is commonly used for user authentication in modern web and mobile applications.

Text/Data Preprocessing 162 module forms the basis of system 100 specific corpus of private data from which knowledge-based authentication questions and answers are developed against, forming the basis of a Knowledge-Based Authentication system. Software processes and tools of the raw data storage tables 162, transform the corpus of private data from 160 into evolving executable system structures, thereby generating the data taxonomy in 164. With the use of appropriate software tools, such as any Natural Language Processing (NLP), these tools systematically process the corpus of private data into executable multiple-choice questions (MCQs) and answers, forming a Data Taxonomy. In various embodiments, NLP Sentence Constructor is implemented via the Data Taxonomy tables 166 as further illustrated in FIGS. 2A, 2B, 2C and 2D. In this regard, an exemplary system generates the multiple-choice questions based on the plurality of data 160.

In various exemplary embodiments, the Text/Data Preprocessing 162, and its underlying Data Taxonomy 164 and associated Raw Data Storage Tables 166, serves as an input to the NLP Sentence Construction process 168 module. As the system performs the multi-domain, multi-national, and multi-section assessment process via the NLP Sentence Construction process 168 module, thereby determining outputs appropriately selected and required by the entity's governance and compliance criteria, the assessment results obtained by the NLP Sentence Construction process 168 module systematically derive an internal systematic structure, i.e., a story telling process and schema 170. The NLP Sentence Construction process module is configured to capture story genre configuration table 172 for story telling process 170. The NLP Sentence Construction process 168 module thereby derives a set of development requirements based at least in part on the multiple private corpus data sources 160 for evaluation by the project team. In this regard, an exemplary system applies, via the NLP Sentence Construction process 168 module, an NLP Sentence Construction process to the raw data storage tables. The system derives the story telling process 170 based on the NLP Sentence Construction process. The system captures, via the NLP Sentence Construction process 168 module, a plurality of storytelling requirements 172 and associates the story genre configuration table 172 with the story telling process 170. The output of the NLP Sentence Construction process 168 module serves as input to the MCQ Generation processes 174 module. The interactive process (invoked through a callable API) in which the Story Telling Process 170 is built from the story genre configuration table, is further illustrated and represented in detail in FIG. 2E.

FIG. 2E illustrates a process flow 260 for updating MCQs with new data from internal and/or external private corpus sources. The system 100 processes subject matter resources to integrate story telling processes into the system. Once an update request by the API is made, a system receives the request to update the NLP Sentence Construction process (step 161) and may route it through step 162. In various embodiments, the system may interact domain experts for input on the story telling process. Moreover, the system may apply one or more Knowledge Engineering (KE) or Prompt Engineering (PE) methods and/or software tools, subject matter experts and technical specialists, to codify the private corpus data organized by Taxonomic classifications into appropriate sections of the Question-Answer Generation 260 based upon NLP technologies (step 168). As new private corpus data is being entered into the system for 260, the system may apply version control tags to the underlying data 260. Additionally, the system may apply quality assurance processes to the updated MCQs and may update reporting and tracking databases (step 180). In response to updating the reporting and tracking databases, the system may return to the calling service (step 262).

In various exemplary embodiments, continuing with FIG. 1C, in response to the outputs of the NLP Sentence Construction process 168 module and the MCQ Generation process module 174, a One-Time Use Filter process is started by the system via process 180 module. The NLP Sentence Construction process 168 enables a story telling process feeding the MCQ Generation Process. The One-Time Use Filter process 180 uses nearest neighbor one-time use matching techniques process 182. The choice of matching technique is not limited to nearest neighbor, and may depend on the specific characteristics of the data and the private corpus domain. Moreover, multiple methods may be tried with sensitivity analyses to assess the robustness of results across different matching techniques. Other suitable matching techniques may include, but are not limited to, Kernel Density Estimation (KDE), Propensity Score Matching (PSM), Exact Matching, Coarsened Exact Matching (CEM), Weighting Methods, Mahalanobis Distance Matching, Covariate Balancing Propensity Score (CBPS), Machine Learning Methods, Time Series Matching, among others.

The process block 192 captures existing industry AI Model-Ops practices which may interface with the system. Included in 192 are industry standard sub-processes representing AM/ML Model Development 194 (for example, data regularization/engineering, normalization, model design, prototyping, development, verification/validation, and testing), Production Deployment 196 (resilience and release management), and Monitoring/Observation 198 of AI/ML models in production. Monitoring models in production, if performed, is one method of measuring ongoing model effectiveness. It will be appreciated that the inventive systems and processed disclosed herein may be coupled and co-exist with industry AI Model-Ops processes, as illustrated between the interactions of 174 and 194, 180 and 196, and 186 and 198. In addition, other variations of AI Model-Ops, not shown in the figure, may contain candidate model evaluations, experimentation methods, metrics development, and/or other suitable model related functions. All such functions are deemed to be within the scope of the present disclosure.

Figure 2A:
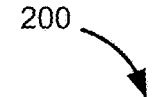
FIG. 2A illustrates a block diagram of exemplary components of a system for passwordless authentication services, in accordance with various embodiments.
Figure 2A:
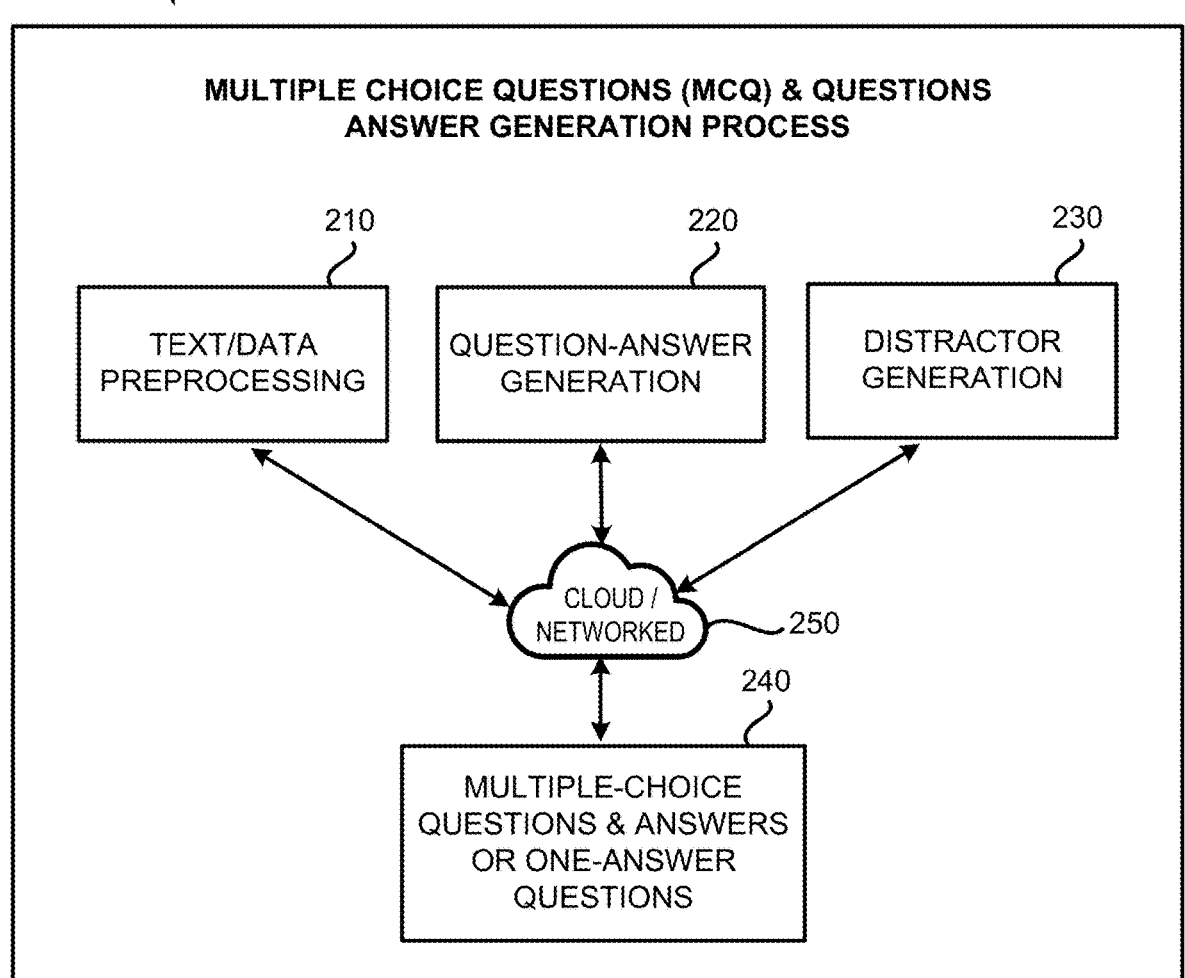
Figure 2C:
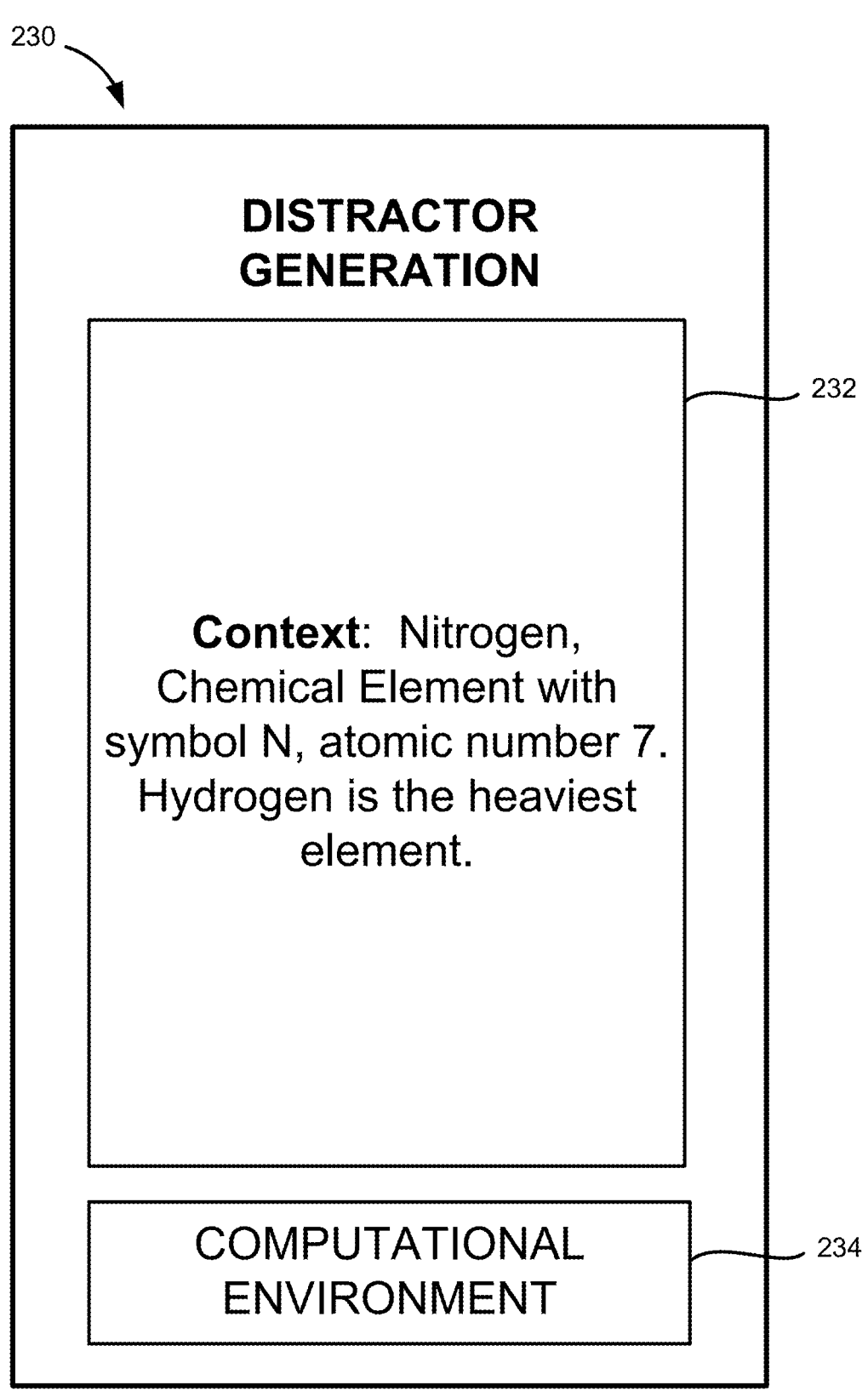
FIG. 2C illustrates subcomponents of an exemplary text-date preprocessing system, in accordance with various embodiments.
Figure 2D:
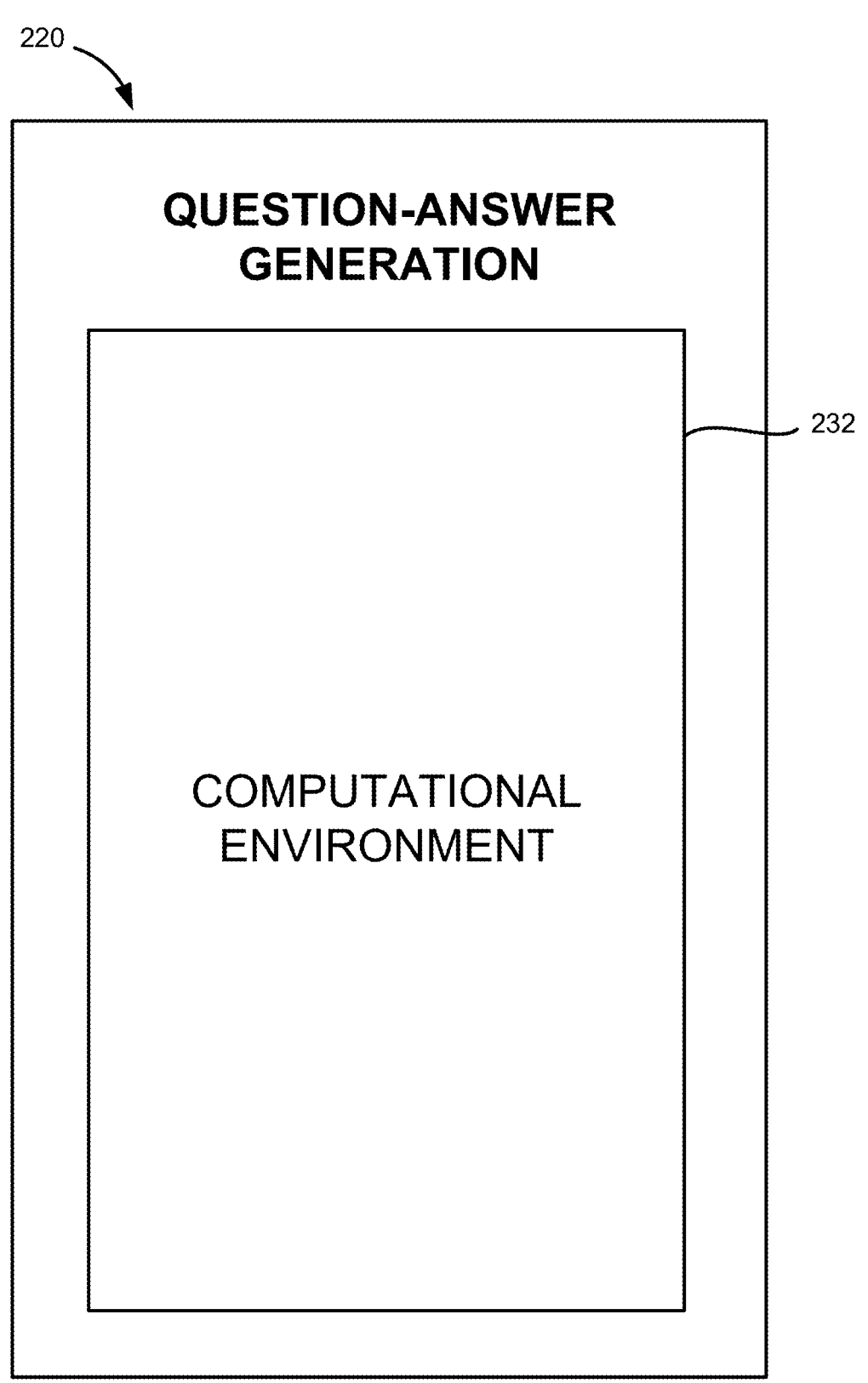
FIG. 2D illustrates subcomponents of an exemplary distractor generation system, in accordance with various embodiments.
Figure 2F:
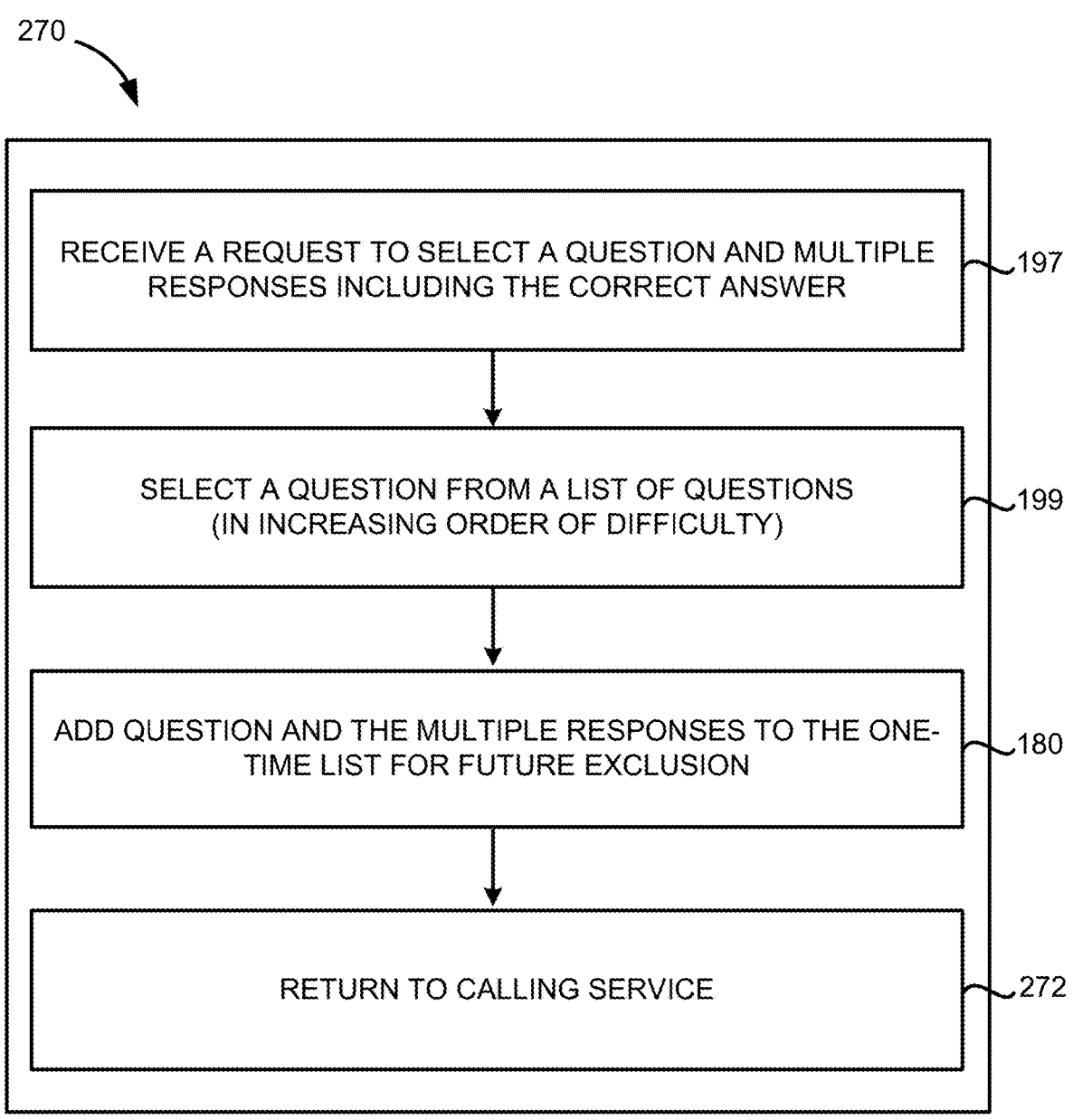
FIG. 2F illustrates a process flow for utilizing a knowledge-based question along with correct answer and detractors, in accordance with various embodiments.

In various embodiments, FIG. 2F illustrates a process flow 270 for retrieving a one time use question utilized in system 100. The one time use question with the correct answer or multiple-choice question with one correct answer, using a digital identifier for unique customer is retrieved. This digital identifier can be a GUID (Globally Unique Identifier) or something unique to the calling entity (e.g., Identity & Access Management, Risk Management, Fraud Management system, and others) that has been adequately verified with a suitably high level of assurance. It will be appreciated that the unique digital identifier is not limited to GUID, and may include one or more of the following:

UUID (Universally Unique Identifier)—UUID, used interchangeably with GUID, and represents an identifier (such as a 128-bit, 256-bit, 512-bit, 1024-bit, or other suitable size and/or format identifier) designed to be unique across both time and space.

UID (Unique Identifier)—something that encompasses various methods of creating identifiers that are unique within a specific context.

SID (System Identifier)—Specifically used in Microsoft Windows operating systems to uniquely identify security principals such as users and groups.

CI (Cryptographic Identifier): Indicates an identifier that is generated using cryptographic techniques to ensure uniqueness and security.

RID (Resource Identifier): Used to uniquely identify resources, such as database records, within a particular system or application.

OID (Object Identifier)—Used in the context of distributed databases or object-oriented systems to uniquely identify objects or data.

MID (Machine Identifier): A unique identifier assigned to a specific machine or device.

TID (Transaction Identifier): To uniquely identify a transaction in a database or distributed computing environment.

In various exemplary embodiments, process 197 may receive a request to select a one or more questions and multiple responses (including an indication of the correct answer). After input validation (e.g., incorrect or missing digital identifier) it may proceed to select a question or questions from a list of questions in increasing order of difficulty in process 199. It may use the previously used questions (exclusion) list to remove those questions from the potential response. It may add (store) what is left in the response onto the future exclusion list of used one-time use questions and answers in process 180. In response to retrieving question/answer combinations, the system may return to the calling service (step 272).

Figure 2G:
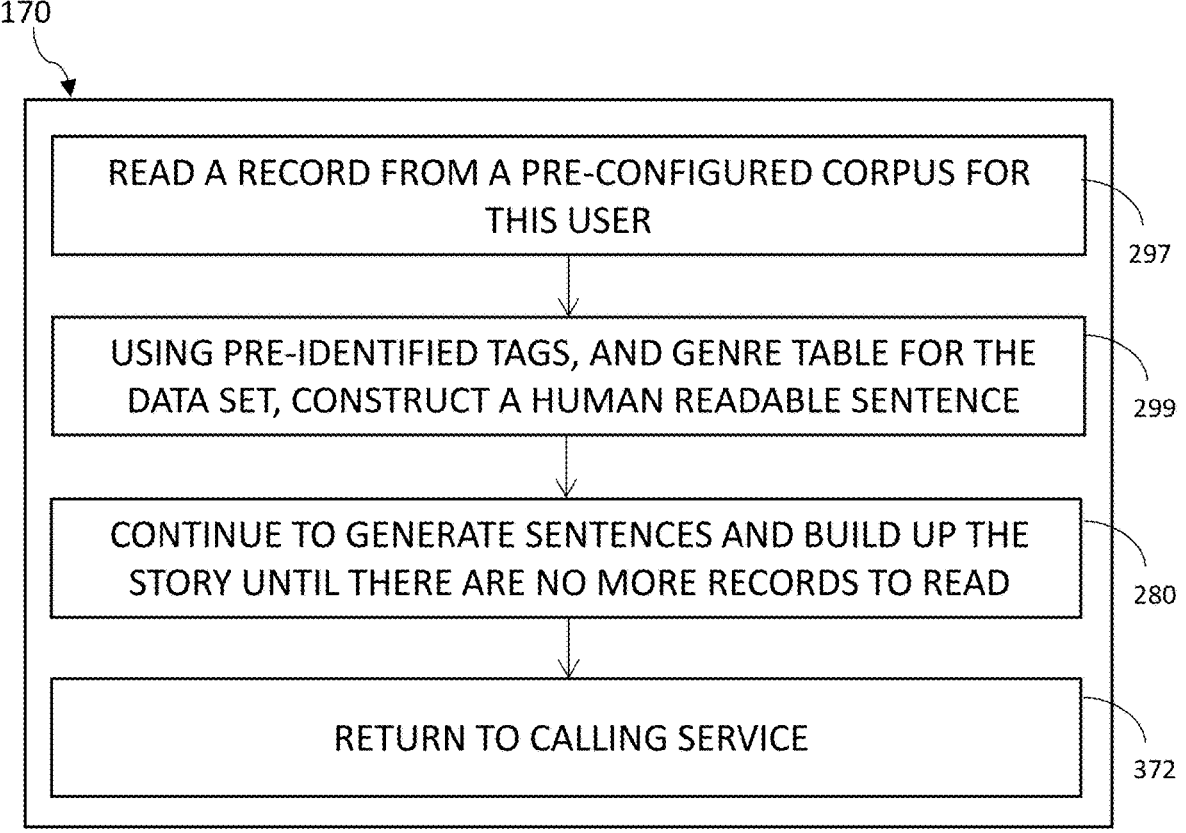
FIG. 2G illustrates a process flow for using a story telling process using various private corpus sources and formats of data, in accordance with various embodiments.
Figure 2K:
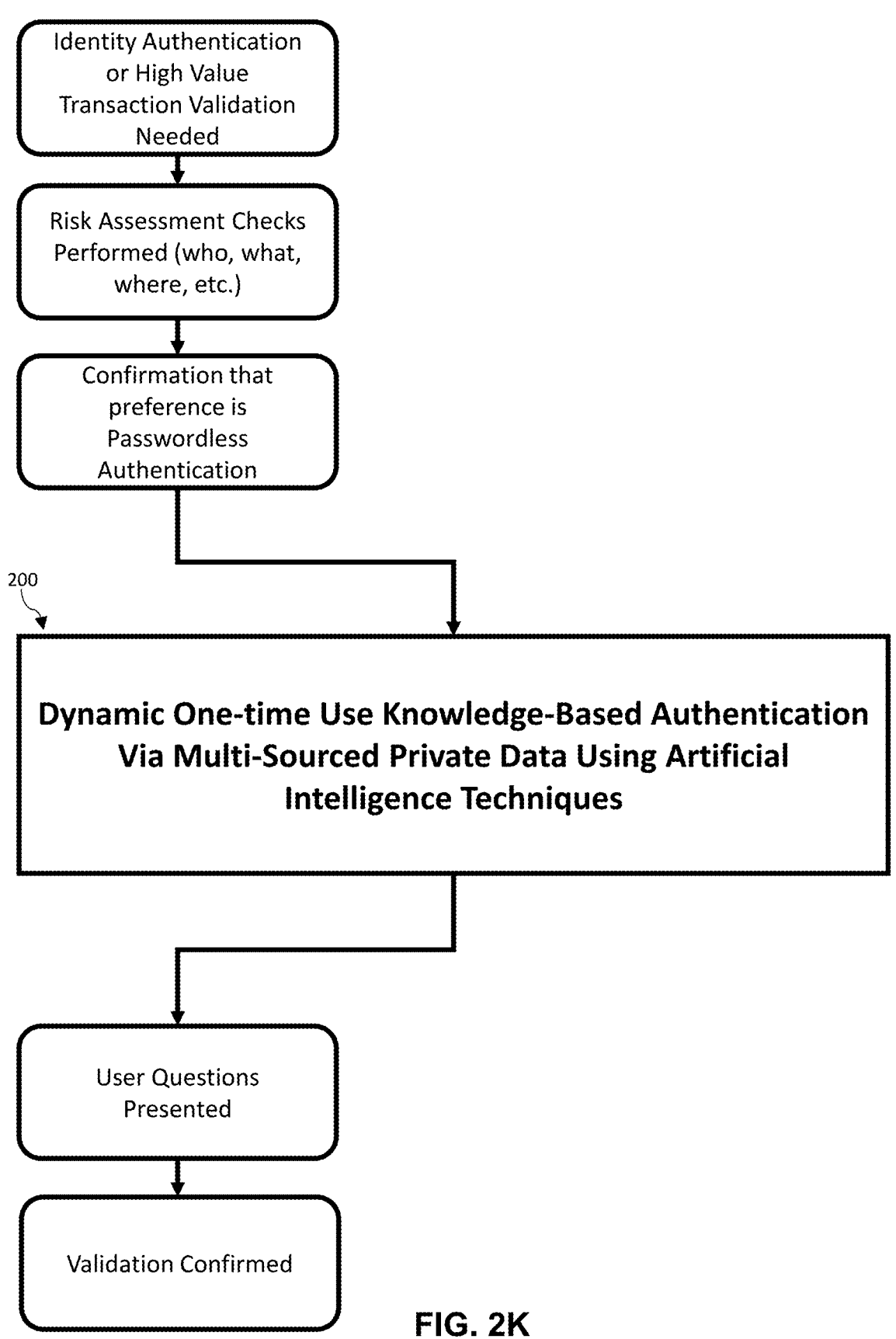
FIG. 2K illustrates an example flow of how a system for passwordless authentication services is invoked by authentication or financial transaction services, in accordance with various exemplary embodiments.

FIG. 2G illustrates, in connection with various embodiments, a process flow 170 for construction of sentences for use in a story telling process with every data record read (step 297) from internal and/or external private corpus sources. The system 100 processes use subject matter resources to integrate story telling processes into the system. It uses Knowledge Engineering (KE) or Prompt Engineering (PE) methods and/or software tools, subject matter experts and technical specialists, using pre-defined tags, and words from genre table 172 (healthcare-prescription, healthcare-laboratory-results, credit-card-subscription, geo-location-commercial-business-name, and/or the like) for the data set to construct human-readable sentence in step 299. It continues to generate new sentences in step 280 for every record read from internal and/or external private corpus sources, until there are no records, when it returns to the calling service in step 372.

In various embodiments: FIG. 2H illustrates how a sentence is constructed from a private healthcare corpus data in FHIR JSON format; FIG. 2I illustrates how a sentence is constructed from a private corpus of credit card data in CSV format; and FIG. 2J illustrates various use-cases for private corpus data, such as healthcare, credit card, calendaring, mobile carrier geo-location data, and the like, together with extracted multiple-choice questions (MCQs) and the respective answers.

In various embodiments, the system can receive a request to update a collection of private corpus data through an API. The raw private data associated with a specific user, identified by a unique user identifier, undergoes text and data preprocessing in step 162, then moves to the NLP sentence construction module in step 168, and finally proceeds to the multiple-choice question generation process in step 174. An acknowledgment, indicating success or failure, is sent back to the requesting entity for the identified user.

In various embodiments, when a user initiates authentication or a high-risk transaction (e.g., transferring money online), and the system requires password-less authentication, it sends a validated unique user identifier to the password-less authentication system. The password-less authentication system chooses a multiple-choice question, which may be sorted by difficulty, using a one-time use filter process in step 180. It then sends the first question along with potential answers, including the correct one, to the caller using APIs. This interaction occurs through common API protocols such as, and not limited to, REST (REST APIs or RESTful APIs), SOAP (Simple Object Access Protocol), GraphQL (Graph query language), RPC APIs (employing either JSON or XML), Composite APIs (allowing multiple APIs to be bundled calls or requests and receive one unified response), gRPC (gRPC Remote Procedure Call), Open APIs (public APIs), XML-RPC (XML is "Extensible Markup Language,"), AsyncAPI, Thrift, and/or the like. The selected MCQ is moved from to the one-time used Q&A Table in step 184. The calling entity, based on other risk factors and an overall risk score, allows authentication or money transfer action to proceed forward.

The process flows and screenshots depicted are merely embodiments and are not intended to limit the scope of the disclosure. For example, the steps recited in any of the method or process descriptions may be executed in any suitable order and are not limited to the order presented. It will be appreciated that the following description makes appropriate references not only to the steps and user interface elements, but also to the various system components as described herein. It should be understood that, although exemplary embodiments are illustrated in the figures and described herein, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using a removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, flash memory, and/or the like.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like. Still further, the system could be used to detect or prevent security issues with a client-side scripting language, such as JAVASCRIPT®, VBScript, or the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise, in any number of configurations, including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using a JAVASCRIPT® run-time environment configured to execute JAVASCRIPT® code outside of a web browser. For example, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components may be contemplated. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQTM (formerly MQSeries) by IBM®, Inc. (Armonk, NY) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Association of certain data may be accomplished through various data association techniques. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with various embodiments, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these conditions may be annotated in a standard manner. The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions, such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data, but instead the appropriate action may be taken by providing to the user, at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The data may be big data that is processed by a distributed computing cluster. The distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant, smartphone (e.g., an IPHONE® device, a ANDROID® device, or the like), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet may be contemplated.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing information such as commands, queries, files, data for storage, and the like in digital or any other form.

Benefits, other advantages, and solutions to problems have been described herein with regard to specific embodiments. Furthermore, the connecting lines shown in the various figures contained herein are intended to represent exemplary functional relationships and/or physical or communicative couplings between the various elements. It should be noted that many alternative or additional functional relationships or physical or communicative connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" or "at least one of A, B, and C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching may be used throughout the figures to denote different parts but not necessarily to denote the same or different materials.

Methods, systems, and articles are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A computer-implemented method for passwordless authentication, comprising:
    receiving, by an authentication system, a private corpus of data associated with a user;
    processing, by the authentication system, the private corpus to initiate generation of a set of challenge questions;
    receiving, by the authentication system and over a network, a request for authentication from a user device associated with the user;
    reading a first record from the private corpus of data, in response to receiving the request for authentication;
    generating an intermediate semantic representation that associates conceptual knowledge with linguistic expressions from the first record;
    generating distractor content to differ semantically while remaining contextually plausible;
    generating distractor sentences using concepts drawn from different knowledge domains;
    using pre-identified tags, a genre table for the data set and semantic representation, for constructing a human-readable sentence with natural-language statements based on the first record,
    wherein the genre table determines vocabulary selection, sentence form and narrative framing for constructing the human-readable sentence that is contextually appropriate;
    maintaining domain-specific linguistic structures defining permissible vocabulary, sentence forms, and conceptual groupings used during content generation;
    repeating the reading and constructing steps until a plurality of human-readable sentences are constructed for each of the records in the private corpus of data;
    evaluating the generated content against domain rules to ensure consistency with intended subject matter prior to presentation,
    wherein the plurality of the human-readable sentences form a set of challenge questions;
    delivering, by the authentication system and to the user device via the network, a first challenge question from the set of challenge questions;
    responsive to receiving, by the authentication system and over the network and from the user device, the correct answer to the first challenge question, authenticating the user; and
    granting, by the authentication system, access to at least one of a secure computer, application or website.

2. The method of claim 1, wherein the constructing the human-readable sentence based on the first record uses at least one of pre-defined tags, multiple choice questions (MCQ) ontology or a genre configuration table that governs how questions are at least one of selected, clustered or themed.

3. The method of claim 2, wherein the private corpus of data comprises data regarding events taking place within a predetermined time frame prior to the receiving.

4. The method of claim 3, wherein the predetermined time frame is less than one week, or less than two weeks, or less than one month.

5. The method of claim 4, wherein the private corpus of data comprises at least one of credit card transactions for a credit card of the user, geolocation data for the user device, healthcare records associated with the user, or calendar appointment information for the user.

6. The method of claim 2, further comprising, responsive to the authenticating, at least one of deleting the first challenge question from the set of challenge questions or flagging the first challenge question to prevent re-use.

7. The method of claim 1, wherein the first challenge question comprises a zero-knowledge proof.

8. The method of claim 1, wherein the constructing the human-readable sentence based on the first record uses at least one of the genre table or a distractor look up table.

9. The method of claim 1, further comprising:
responsive to receiving, by the authentication system and over the network and from the user device, an incorrect answer to the first challenge question, delivering to the user device, via the network, a second challenge question from the set of challenge questions.

10. The method of claim 9, wherein the second challenge question is based on more data from the private corpus of data than the first challenge question.

11. The method of claim 10, further comprising flagging, by the authentication system and in the set of challenge questions, the first challenge question and the second challenge question to prevent reuse of the first challenge question and the second challenge question.

12. The method of claim 11, further comprising deleting, by the authentication system, the flagged challenge questions from the set of challenge questions.

13. The method of claim 1, wherein the first challenge question is a multiple-choice question.

14. The method of claim 1, further comprising:
receiving, by the authentication system and over the network, update data associated with the user;
adding, by the authentication system, the update data to the private corpus of data;
processing, by the authentication system, the update data to generate additional challenge questions; and
adding, by the authentication system, the additional challenge questions to the set of challenge questions.

15. The method of claim 1, further comprising annotating, by the authentication system and in the set of challenge questions, each challenge question with a use-by date by which the challenge question should be used or discarded.

16. The method of claim 15, wherein each record in the private corpus of data has a generation date, and wherein the use-by date is a predetermined number of days from the generation date of the record in the private corpus from which the associated challenge question was generated.

17. The method of claim 1, further comprising deleting, by the authentication system and from the set of challenge questions, at least one challenge question having a use-by date prior to a current date.

* * * * *